(12) United States Patent
Nakada et al.

(10) Patent No.: US 6,774,829 B2
(45) Date of Patent: Aug. 10, 2004

(54) APPARATUS AND METHOD FOR RECEIVING SIGNALS INCLUDING DATA CARRIERS AND PILOT CARRIERS MODULATED BY MULTI-CARRIER MODULATION METHOD

(75) Inventors: Tatsuhiro Nakada, Akishima (JP); Hiroyuki Takesue, Hachioji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 10/679,337

(22) Filed: Oct. 7, 2003

(65) Prior Publication Data

US 2004/0071221 A1 Apr. 15, 2004

(30) Foreign Application Priority Data

Oct. 8, 2002 (JP) ........................................ 2002-295242

(51) Int. Cl.[7] .............................................. H03M 1/00
(52) U.S. Cl. ........................ 341/126; 370/206; 370/509
(58) Field of Search ................................ 341/126, 159; 370/206, 208, 210, 509, 508, 215; 375/298, 300, 320, 142, 150, 316

(56) References Cited

U.S. PATENT DOCUMENTS 5,602,835 A * 2/1997 Seki et al. .................. 370/206
6,108,353 A * 8/2000 Nakamura et al. .......... 370/504

* cited by examiner

Primary Examiner—Michael Tokar
Assistant Examiner—John B Nguyen
(74) Attorney, Agent, or Firm—Antonelli, Terry, Stout & Kraus, LLP

(57) ABSTRACT

A receiving apparatus and a receiving method for receiving a signal modulated by a multi-carrier modulation scheme for transmitting the information code using a plurality of carriers. The signal contains data carriers and regularly-inserted pilot carriers fixed in amplitude and phase. The cross-correlation between the received signals with the data carriers distant to such an extent as to eliminate the correlation with each other is calculated, and based on the result of the cross-correlating operation by the correlating operation unit, the signal correlation component as related to the pilot carriers is extracted.

22 Claims, 10 Drawing Sheets

GUARD INTERVAL   EFFECTIVE SYMBOL

REAR END OF GUARD INTERVAL

MAIN WAVE    REFLECTED WAVE

FIG.6
(a) DIFFERENTIATED WAVEFORM
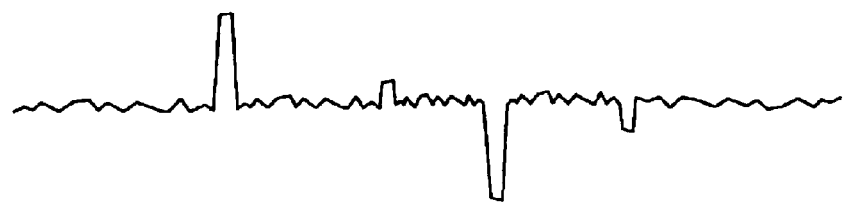
(b) DELAY PROFILE
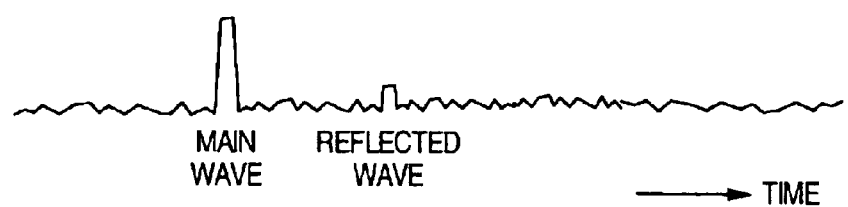
MAIN WAVE    REFLECTED WAVE    → TIME
FIG.7
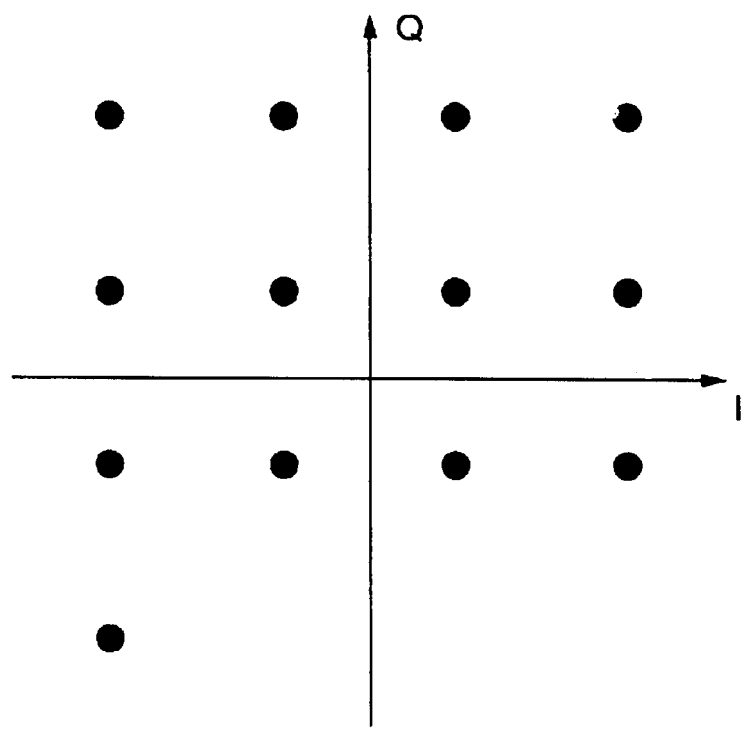

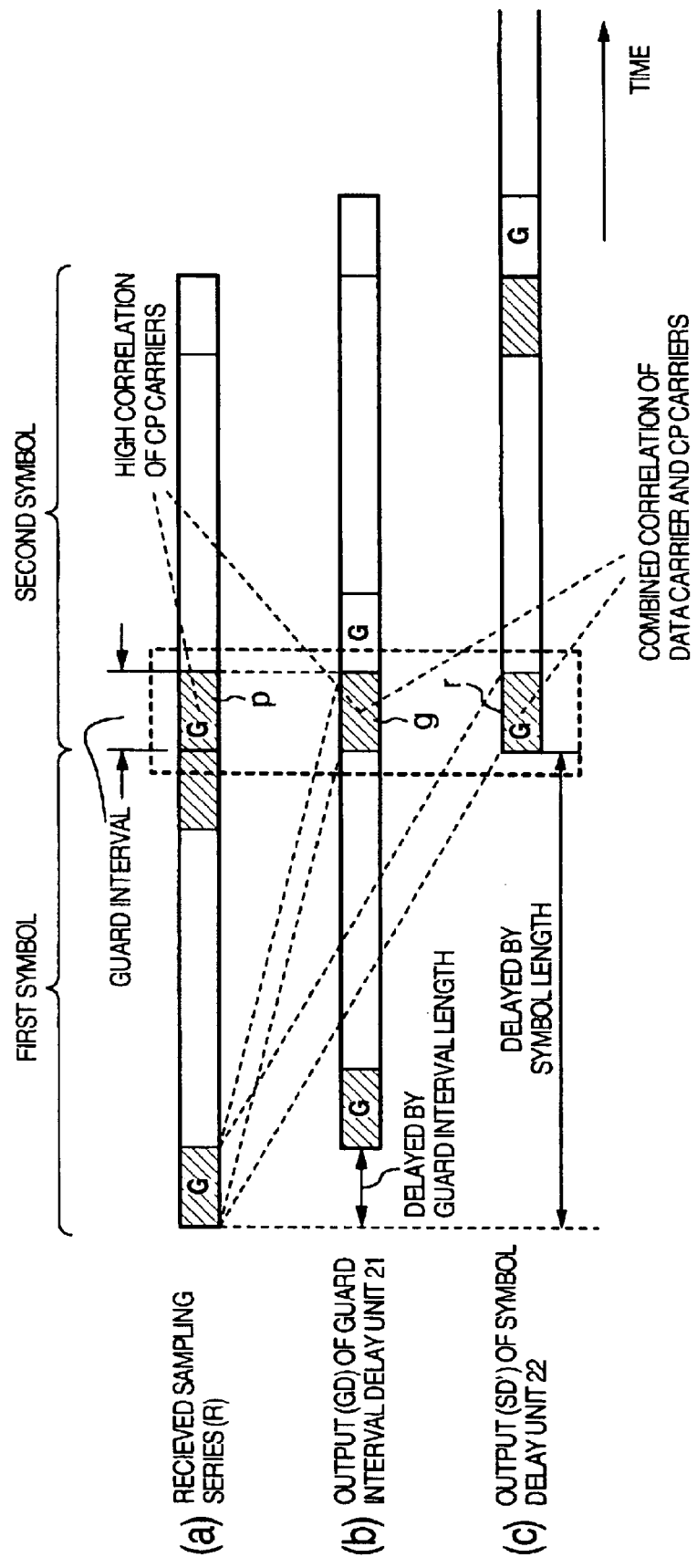

APPARATUS AND METHOD FOR RECEIVING SIGNALS INCLUDING DATA CARRIERS AND PILOT CARRIERS MODULATED BY MULTI-CARRIER MODULATION METHOD

BACKGROUND OF THE INVENTION

The present invention relates to an apparatus and a method for receiving signals modulated by a multi-carrier modulation scheme for transmitting the information code using a plurality of carriers, or in particular to a receiving apparatus for receiving the signals containing data carriers and regularly-inserted pilot carriers having a fixed amplitude and a fixed phase.

This invention is suitably applicable to a receiving apparatus for receiving the signals modulated by the OFDM (Orthogonal Frequency Division Multiplex) modulation scheme with pilot carriers inserted therein, and an OFDM receiving apparatus having the functions of clock synchronization or generation of a delay profile utilizing the correlation of guard intervals.

In recent years, the OFDM modulation scheme, which is highly resistant to multi-path fading and ghost, has been closely watched as a modulation scheme suitable for application to the digital audio broadcasting for mobile units and the terrestrial digital TV broadcasting. The OFDM modulation scheme is a type of multi-carrier modulation scheme in which n (n: several tens to several hundreds) carriers orthogonal to each other are digitally modulated.

The I-axis component and the Q-axis component of each of these carriers is assigned a discrete code as a modulated signal, which code is updated every symbol period (several tens of $\mu$s). As shown in FIG. 2, a multiplicity of digitally modulated waves $\Delta f$, $2\Delta f$, $3\Delta f$, ..., $(n-1)\Delta f$ are added to each other, and an OFDM signal obtained by orthogonal modulation of the I and Q axes is transmitted. The multi-carrier digital modulation schemes often used are multi-valued modulation schemes such as the 16 quadrature amplitude modulation (16QAM) and the 32 quadrature amplitude modulation (32QAM) as well as the differential quadrature phase shift keying (DQPSK).

The OFDM signal is obtained by subjecting a plurality of the carriers of the I and Q components to the inverse fast Fourier transform (IFFT) and converting the carriers into a temporal waveform. The OFDM signal is configured, as shown in FIG. 3, of an effective symbol providing a temporal waveform after the IFFT processing and a guard interval copied from a part of the valid symbol and added before the valid symbol. According to the OFDM modulation scheme, the addition of the guard interval can prevent the deterioration due to the inter-symbol interference of the delayed wave in the delay time during the guard interval period. Therefore, the OFDM modulation scheme has a high resistance against the multi-path fading. In this way, the signal identical with the end portion of the symbol is added to the head of the symbol as a guard interval, and therefore, in the OFDM transmission apparatus, the cross-correlation between the head and the end of the symbol is utilized for demodulation and synchronization.

Next, the processing of the received signal utilizing the correlation of the guard intervals is explained.

In the OFDM modulation scheme, the frequency intervals between subcarriers are so small that the interference between subcarriers is likely to occur due to the carrier frequency error between the transmitter and the receiver and the sampling clock frequency error of the demodulation system. The reproduction of these frequencies, therefore, requires a high accuracy. Specifically, in order to continue to receive the OFDM signal correctly, the sampling clock reproduction process is required in which the sampling clock frequency at the receiving end is kept coincident with the sampling clock frequency of the transmission signal at highly accuracy.

In view of this, the technique for reproducing the sampling clock utilizing the correlation of the guard intervals is disclosed in U.S. Pat. No. 5,602,835. An OFDM receiving apparatus utilizing the correlation of the guard intervals is briefly explained with reference to FIG. 16.

The received signal input to the receiving antenna 1 is converted to a baseband signal through a high-frequency unit 2 and an intermediate-frequency unit 3. The baseband signal is converted from an analog form to a digital form by an A/D converter 4. The received sampling series (R) converted to digital form are returned by a FFT (fast Fourier transform) operation unit 8 to a frequency waveform signal from a temporal waveform signal subjected to the IFFT operation at the transmitting end, and demodulated to the original signal by a demodulation unit 9.

The receiving sampling series (R) and the signal delayed by a time length equal to the valid symbol period in a valid symbol delay unit 11 are subjected to the cross-correlating process to each other by a correlator 13. From the result of this cross-correlating operation, only the result of the correlating operation for the signal range corresponding to the guard interval period is extracted. Then, the range of extraction of the correlating operation result is shifted by one sample period and the corresponding correlating operation result is extracted. Over the entire signal section for the cross-correlating operation, the same extraction process is repeated while shifting the extraction range of the correlating operation result by one sample period each time. The values of the repeated correlating operation thus extracted are added to obtain a waveform having a peak indicating the position of a guard interval as shown in FIG. 4. Outside the guard interval period, the two signals have no correlation and, therefore, the correlation result is approximately zero in value. With the arrival at the guard interval, however, the correlation begins to present itself and the result of addition value increases linearly. The correlation value reaches a peak at the time point when the addition period coincides with the guard interval. After this time point, the addition period begins to be displaced from the guard interval, and therefore the correlation value begins to decrease. The correlation waveform, therefore, assumes a triangle as shown in FIG. 4. Actually, however, this triangular wave is usually contained noises due to the random characteristic of the OFDM signal as described later.

The peak of the triangular wave representing the correlation value indicates the ending time point of the guard interval. In the symbol timing detector 5 for detecting the peak position, therefore, the sampling clock frequency of a VCO 7 is controlled through a VCO controller 6 in such a manner as to maintain the peak at a predetermined position. In this way, the clock reproduction processing can be realized.

The OFDM transmission, for the feature of the modulation scheme thereof, is often used for the mobile communication. In outdoor transmission, a multiple communication paths are formed to transmit the main wave arriving directly from the transmitter and waves reflected on buildings and the like and arriving with a delay time in accordance with the topographic conditions. Further, in mobile communication, a fading environment may be generated with the levels of the main wave and the reflected waves changing each moment. The multi-path communication undesirably causes the synchronization of the FFT demodulation windows at the receiving end with the reflected waves or the inter-symbol interferences in the presence of reflected waves exceeding the range of the guard intervals.

This inter-symbol interference causes a deterioration of the carrier-to-noise ratio (C/N), and causes the deterioration of the code error rate. In order to improve the reliability of the transmission, therefore, it is necessary to select a propagation path environment free of reflected waves exceeding the guard intervals. Very effective means for improving the reliability of communication, therefore, is to observe the propagation path characteristics and to employ a transmission scheme suited to the particular propagation path characteristics.

The most widely used method for observing the propagation path characteristics is the measurement of a delay profile indicating the levels of the main wave and the reflected waves and the delay time, as disclosed in JP-A-2002-232389, for example. In order to produce this delay profile, the received sampling signal and a signal obtained by delaying the received sampling signal by the length equivalent to the valid symbol period are cross-correlated by the correlator 13 shown in FIG. 16, and the result of correlation is averaged in the direction of the symbol (along the time axis) thereby to obtain a waveform as shown in FIG. 5.

The result of averaging the correlated values is processed by a differentiator 10 shown in FIG. 16, thereby making it possible to calculate a differential waveform as shown in (a) of FIG. 6. Further, the negative signal components of the differential waveform are removed. In this way, a delay profile waveform as shown in (b) of FIG. 6 is obtained.

SUMMARY OF THE INVENTION

As described above, according to the OFDM scheme, each carrier may be digitally modulated by a scheme such as 16QAM or 32QAM. In these modulation schemes, the carrier signal is mapped to the information code in constellations as indicated by black spots in FIG. 7, so that the information is contained in the amplitude (distance from the origin) and the phase (angle from a reference point) of each carrier. For demodulation, therefore, the absolute amplitude and the absolute phase of each received carrier are required to be reproduced accurately.

In the adverse environments of the mobile communication and the multi-path communication, the amplitude and phase of each carrier undergoes a change at each moment. The amplitude and phase, therefore, must be reproduced sequentially at high speed. For this reason, pilot carriers having a constant amplitude and a constant phase are arranged for each several carriers of the transmission signal, and based on the pilot carriers of the received signal, the propagation path characteristics are estimated. In accordance with the estimation result, a proper method for reproduction of the amplitude and the phase is selected. Also, in order to improve the transmission performance, the amplitude of the pilot carrier is often set to a somewhat larger value than that of the normal data carrier. For example, the amplitude of the pilot carrier is set to about 4/3 of the amplitude of the data carrier.

The pilot carriers are arranged differently depending on the system conditions. An example of pilot carrier arrangement is described with reference to FIGS. 8A and 8B.

In FIG. 8A, the pilot carriers are arranged at intervals of eight carriers, i.e. for each symbol. These pilot carriers are arranged continuously along the direction of the symbol (along the time axis) and therefore are called continuous pilot carriers (CP).

In FIG. 8B, the pilot carriers are arranged also at intervals of eight carriers, and shifted in position for each symbol. These pilot carriers, therefore, are called scattering pilot carriers (SP).

The maximum delay time in the multi-path communication that can be equalized depends on the intervals of the carriers arranged, and the fading rate that can be equalized depends on the intervals of the symbols arranged. Also, the CP and the SP may be combined to improve the transmission performance.

These pilot carriers, however, with the amplitude and the phase thereof fixed, provide a signal having a predetermined repetitive period for each symbol. In the case where the guard intervals of the signal containing the pilot carriers are correlated in the receiver shown in FIG. 16, the correlation is found over the entire symbol period as well as the guard period, and therefore undesirably has an effect on the correlation result.

The problem described above is explained below specifically with reference to the OFDM signal having the CP carriers arranged for each 8 carrier samples.

In the correlation waveform (FIG. 4) obtained by the receiver shown in FIG. 16, the waveform floor (the bottom portion of the signal) actually rises due to the correlation over the entire symbol period of the CP carriers. FIG. 9 is a diagram for explaining the comparison of these guard interval correlation waveforms. The dotted line designates the guard interval correlation waveform for the received signal lacking the CP carriers shown in FIG. 4, and the solid line designates the guard interval correlation waveform for the received signal with the CP carriers inserted therein.

The ratio of floor level to peak level is 0.125 in the case where the CP carriers are inserted at intervals of eight carriers. In the case where the amplitude of the CP carrier is larger than and 4/3 of that of the normal data carrier, the figure may reach 0.22, resulting in a higher floor level.

A higher floor of the correlation waveform and the resultant smaller level difference between peak and floor increases the chance of generating an error in the detection result of the true peak point. In the transmission path, not a small amount of noises come in. In the received signal containing noises, the probability is high that the correlation peak value of the guard intervals assumes a higher value than the original peak value. A higher floor, therefore, has the disadvantage that the peak positions are erroneously detected even with small amount of noises, and is more likely to have an adverse effect on the control operation of the sampling clock.

Also, in the case where the FFT demodulation window for the received signal is formed based on the peak positions, the likelihood of erroneous detection of peak positions leads to the disadvantage that an inter-symbol interference occurs.

As described above, even with different symbols, the CP carriers have a correlation with each other over the entire symbol period. Once multiple paths occur, therefore, as shown in FIG. 10, the correlation between the CP carriers of the main waves or between the CP carriers of the reflected waves, coupled with the correlation between a given CP carrier of the main wave and a given CP carrier of the reflected waves, generates a complicated correlation waveform.

As a result, the delay profile shown in FIG. 11 develops waveform irregularities, and the reflected waves of small level disadvantageously become unobservable.

The primary object of the invention is to provide a technique for extracting only the correlation component of the pilot carriers and a technique for extracting a correlation component of the data carriers by extracting the correlation component of the pilot carriers, in a receiving apparatus for receiving a signal of the multi-carrier modulation scheme in which pilot carriers fixed in amplitude and phase are arranged at regular intervals between the data carriers. Extraction of only the correlation component of the pilot carriers leads to various advantages in receiving the signal by the multi-carrier modulation scheme as described below.

For example, the modulation scheme of the signal sent out by a transmitter is can be identified automatically. At the transmitting end, the differential phase shift keying (hereinafter referred to as the differential scheme) or the absolute detection scheme is selectively used in accordance with the transmission path characteristics. In the differential scheme, the pilot carriers of CP and SP are not arranged in the transmission signal. In the case where the modulation scheme is changed at the transmitting end, the receiver is required to automatically follow the particular change of the modulation scheme. According to this invention, the modulation scheme can be automatically identified at the receiving end. The presence or absence of a correlation component of the pilot carrier is detected by the cross-correlating operation of the guard intervals of the received signal. In this way, it becomes possible whether the modulation scheme of the received signal is the differential scheme or the absolute detection scheme.

Further, according to this invention, only the correlation component of the data carrier can be extracted from the signal containing both the correlation component of the data carrier and the correlation component of the pilot carrier by detecting the correlation component of the pilot carrier. As a result, the disadvantages and the problems of the conventional receiver described above can be obviated. Specifically, in the correlating operation of the guard intervals with pilot carriers inserted, the adverse effect of the correlation component of the pilot carriers is removed and only the correlation of the data carriers is extracted. In this way, the performance is improved for the synchronization using the correlating operation of the guard intervals (the sampling clock frequency of the receiver is controlled in such a manner as to coincide with the sampling clock frequency of the transmission signal) or the generation of a delay profile.

In a receiving apparatus and a receiving method according to this invention, a signal modulated by the multi-carrier modulation scheme for transmitting the information code using a plurality of carriers is received, which signal contains data carriers and regularly-inserted pilot carriers fixed in amplitude and phase. The cross-correlation between the received signals with the data carriers distant from each other to such an extent as to substantially eliminate the correlation is calculated, and based on the result of the cross-correlation by the correlating operation unit, the correlation signal component associated with the pilot signals is extracted.

According to an embodiment of the invention, there are provided a receiving apparatus and a receiving method, in which the cross-correlation between the received signal and a signal obtained by delaying the received signal by a predetermined length of the symbol period or a time length corresponding to the repetitive period of the pilot carrier is calculated, and the result of this calculation is used as a first cross-correlation. Based on the first cross-correlation, the correlation component of the signal associated with the pilot carriers is extracted.

According to another embodiment of the invention, there are provided a receiving apparatus and a receiving method, in which the cross-correlation between the received signal and a signal obtained by shifting the received signal by the length of a valid symbol period is calculated, and the result of this calculation is used as a second cross-correlation. The correlation component of the signal associated with the data carrier is obtained by subtracting the first cross-correlation from the second cross-correlation.

According to still another embodiment of the invention, there are provided a receiving apparatus and a receiving method, in which the signal in the extraction range corresponding to the guard interval period is extracted from the result of subtracting the first cross-correlation from the second cross-correlation, and each time the extraction range is shifted by one sample period, the extraction process is repeated over the entire signal section for the correlating operation, and the values of the signal extracted are added. Based on the result of this addition, the difference of the symbol phase of the received signal from a predetermined reference phase is determined, and in accordance with the detected difference, the sampling clock frequency of the received signal is controlled.

Other objects, features and advantages of the invention will become apparent from the following description of the embodiments of the invention taken in conjunction with the accompanying drawings.

BRIEF DESCRIPTION OF THE DRAWINGS

FIG. 6 shows waveforms of a delay profile.

FIG. 7 is a schematic diagram showing an arrangement of signal points according to 16QAM.

FIG. 14 is a diagram for explaining the operation of the guard interval delay unit 21 and the symbol delay unit of the receiving apparatus according to the invention.

DESCRIPTION OF THE EMBODIMENTS

Figure 1:
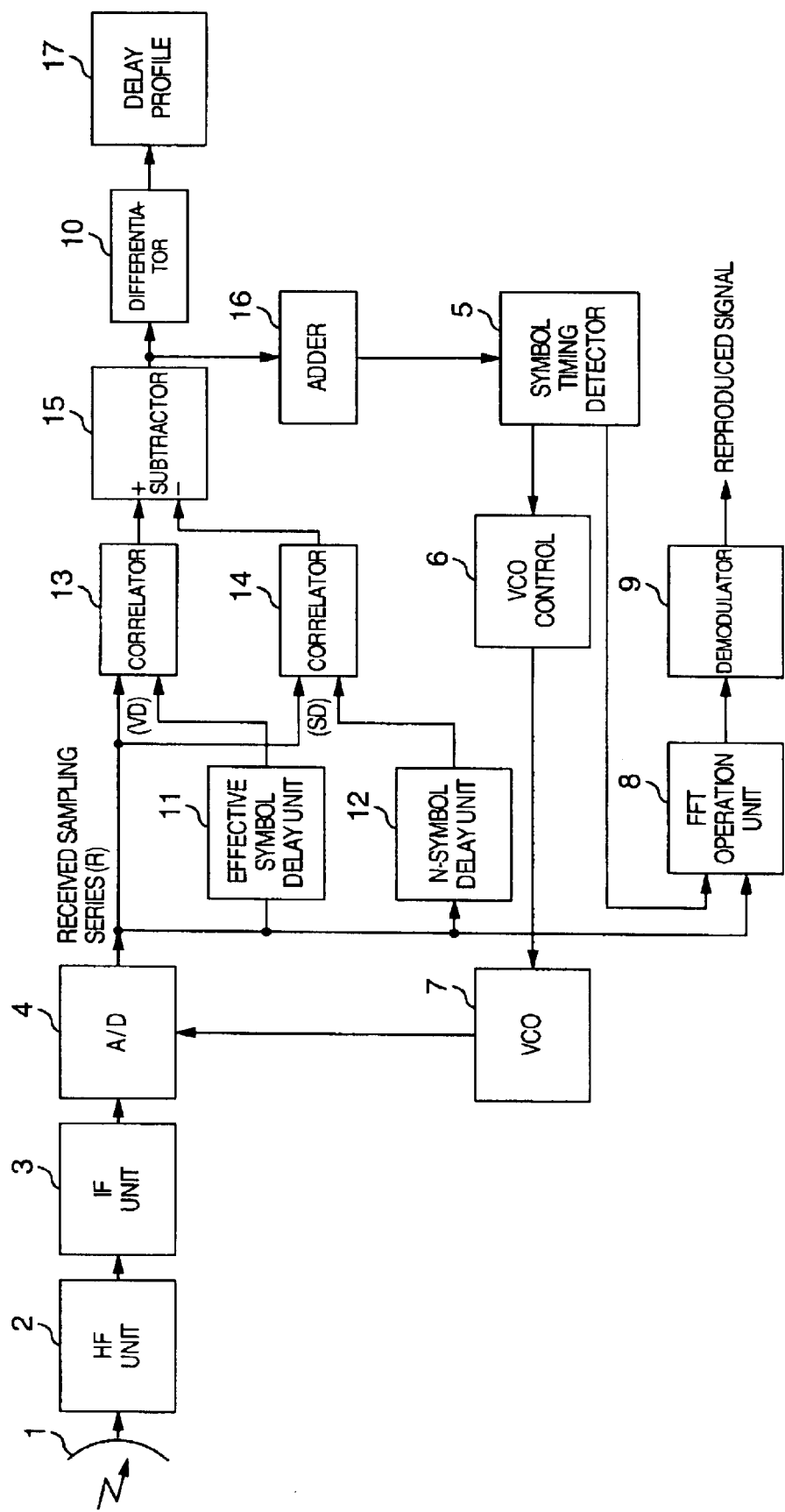
FIG. 1 is a block diagram showing the portion of the process of the synchronized reproduction and the process of generating a delay profile in an OFDM receiving apparatus according to an embodiment of the invention.
Figure 2:
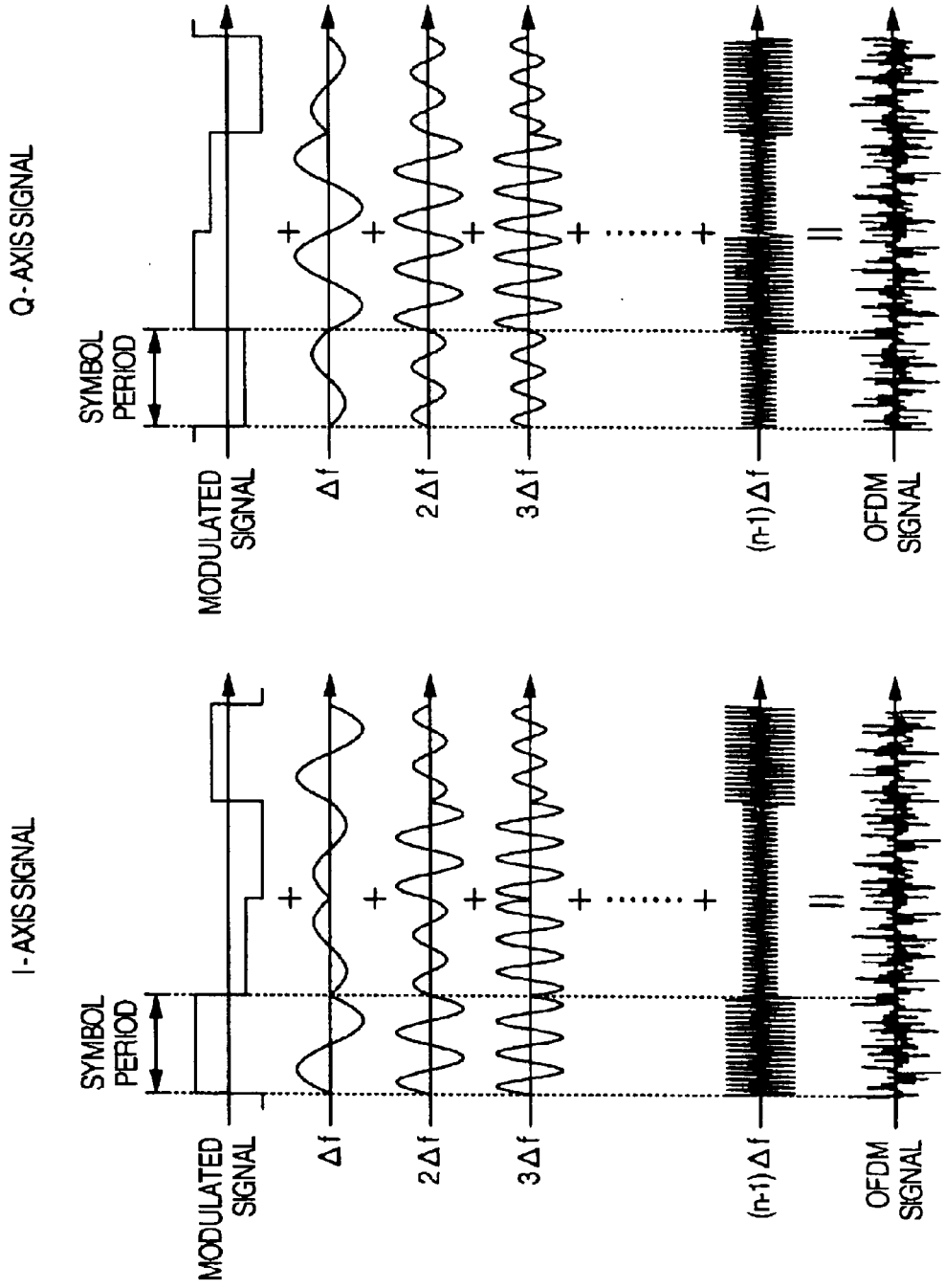
FIG. 2 shows waveforms representing the signal structure of the OFDM signal.
Figure 3:
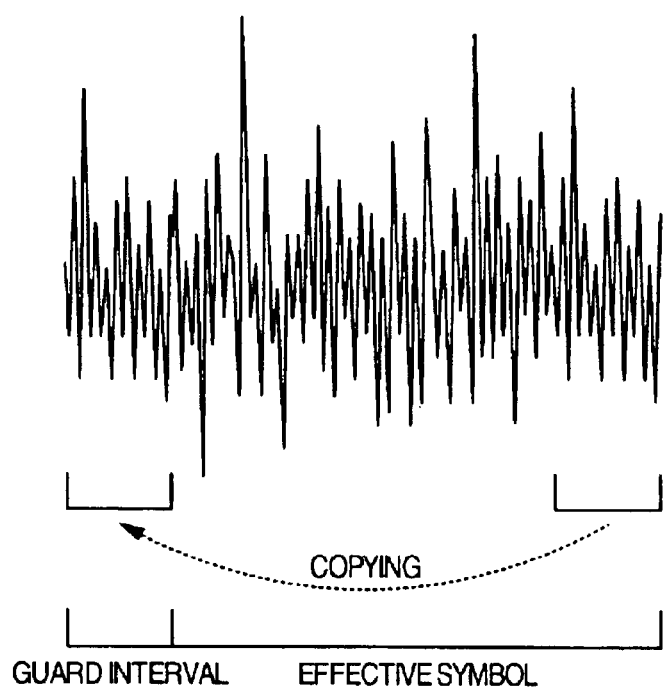
FIG. 3 shows a waveform representing the symbol structure of the OFDM signal.
Figure 4:
FIG. 4 shows a waveform of the guard interval correlation (integrated in sample direction).

An OFDM transmission apparatus according to the invention is described in detail below with reference to the embodiment shown in FIG. 1.

The transmitted signal is received by a receiving antenna 1. The received signal is converted to a baseband signal through a high-frequency unit 2 and an intermediate-frequency unit 3. This baseband signal is an analog signal and converted to a digital signal by an A/D converter 4 into a received sampling series (R).

The received sampling series (R) is input to a valid symbol delay unit 11 and a N-symbol delay unit 12, and delayed for a predetermined period of time in sampling clock units, where N is a positive integer.

The valid symbol delay unit 11 delays the OFDM symbol by a time length equal to the valid symbol period of the OFDM symbol, and the N-symbol delay unit 12 delays the signal by one symbol (N: 1), for example. A specific example of the delay amount at the N-symbol delay unit 12 depends on each system and will be described later.

The received sampling series (R) and the output signal (VD) of the valid symbol delay unit 11 are input to a correlator 13. The correlator 13 calculates the correlation of each signal by the operation of cross-correlating the signal (R) and the signal (VR).

The received sampling series (R) and the output signal (SD) of the N-symbol delay unit 12, on the other hand, are input to a correlator 14. The correlator 14 has a similar configuration to the correlator 13 and calculates the correlation between the signal (R) and the signal (SD).

Figure 12:
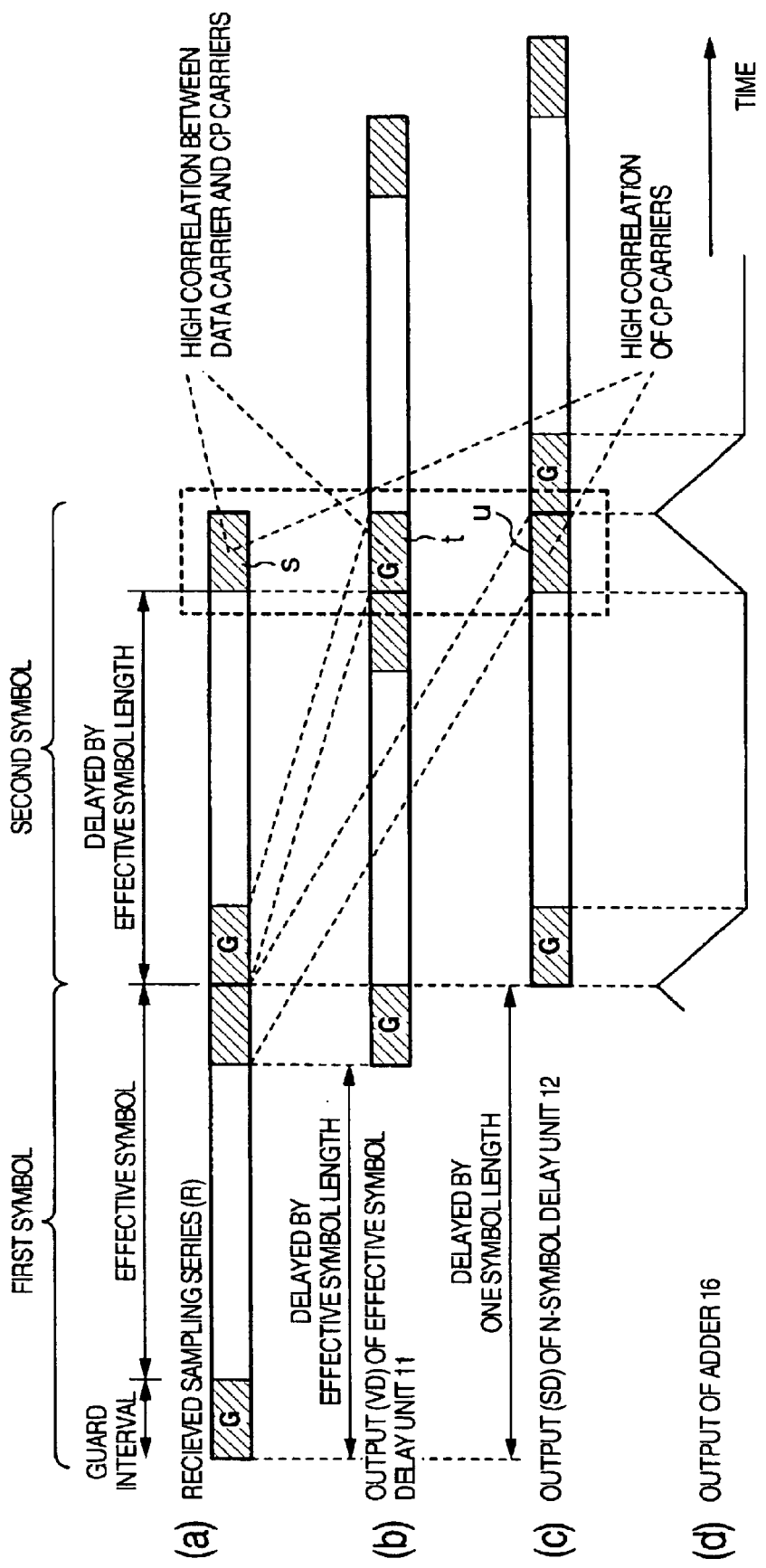
FIG. 12 is a diagram for explaining the operation of a valid symbol delay unit 11 and a N-symbol delay unit 12 of a receiving apparatus according to the invention.

The manner in which the operation of correlating the guard intervals is performed is described in detail with reference to FIG. 12. In FIG. 12, (a) indicates the received sampling series (R), (b) the output signal (VD) of the valid symbol delay unit 11, (c) the output signal (SD) of the N-symbol delay unit 12, and (d) the output of an adder 16.

In each signal, the rectangle defined by a thick solid line indicates one symbol of the OFDM signal. Each symbol has hatched portions at the front and rear ends thereof. The front hatched end indicates a guard interval G, and the rear hatched end indicates a portion having the same signal component as the guard interval.

An explanation will be given with emphasis placed on the area defined by the dotted line at the central portion shown in FIG. 12. The hatched portion s at the rear end of the second symbol of the signal (R) and the guard interval portion t at the front end of the second symbol of the signal (VD) are the rear end portion and the front end portion, respectively, of the same symbol and have the same signal component in the absence of noises and strains.

A high correlation can be obtained, therefore, by calculating the cross-correlation between these signal portions by the correlator 13. The data carrier and the CP carrier, i.e. all the carries of the OFDM signal have the same component, and therefore, this correlation component represents a combination of the correlation of the data carrier and the CP carrier.

Next, the correlator 14 calculates the correlation between the signal (R) and the signal (SD). This is the operation of correlating the hatched portion s at the rear end of the second symbol of the signal (R) and the hatched portion u at the rear end of the first symbol. Also in this case, the hatched portions s and u contain the data carrier and the CP carrier, respectively. Since they are different symbols, however, the hatched portions have no correlation.

Figure 8A:
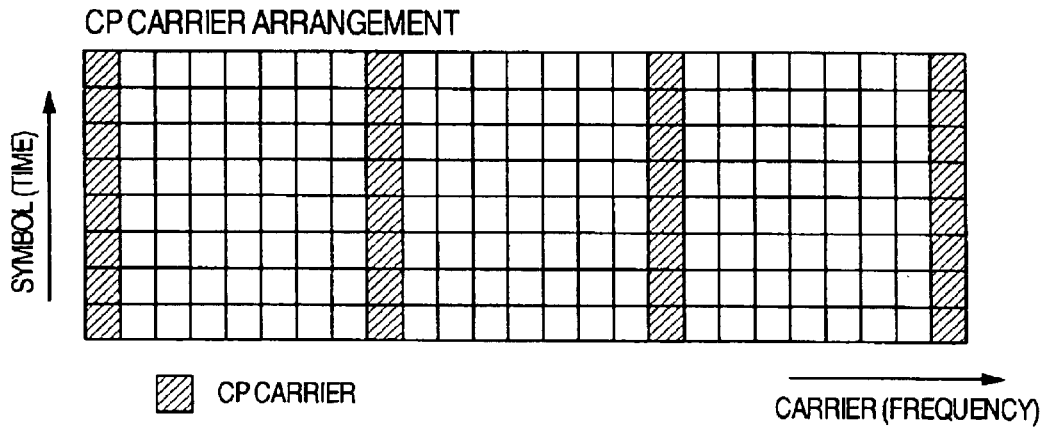
FIGS. 8A and 8B are schematic diagrams showing an arrangement of pilot carriers.

The CP carriers, however, have the same amplitude and the same phase as described with reference to FIG. 8A. Even for different symbols, therefore, the correlation components thereof are correlated to each other.

As described above, the combined correlation component of the data carrier and the CP carrier is output from the correlator 13, and the correlation component of the CP carriers from the correlator 14.

The output signal of the correlator 14 making up the correlation component of the CP carrier is subtracted from the output signal of the correlator 13 making up the combined correlation component of the data carrier and the CP carrier by a subtractor 15. The signal in the range of extraction corresponding to the guard interval period is extracted from the output of the subtractor 15. This extraction process is repeated each time the range of extraction is shifted by one sample period over the entire signal section of the cross-correlating operation, and all the extracted signal values are added thereby to obtain a signal having a peak at the rear end of the guard interval as shown in (d) of FIG. 12. By executing this process, the correlation component of the CP carrier is removed from the combined correlation component of the data carrier and the CP carrier, and thus the guard interval correlation component only for the data carrier can be extracted.

Figure 9:
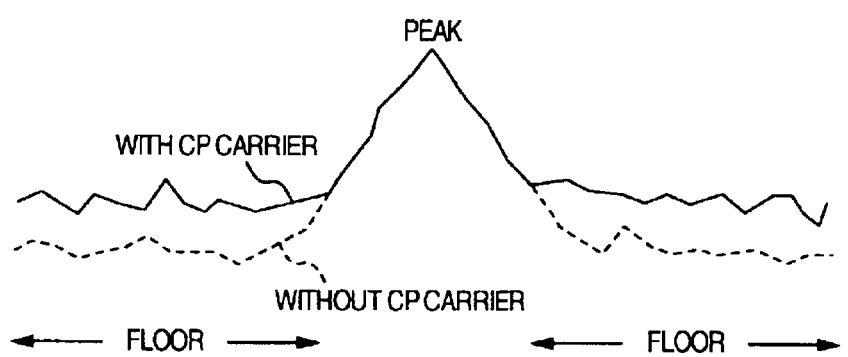
FIG. 9 shows a waveform of the guard interval correlation with CP carriers inserted.
Figure 16:
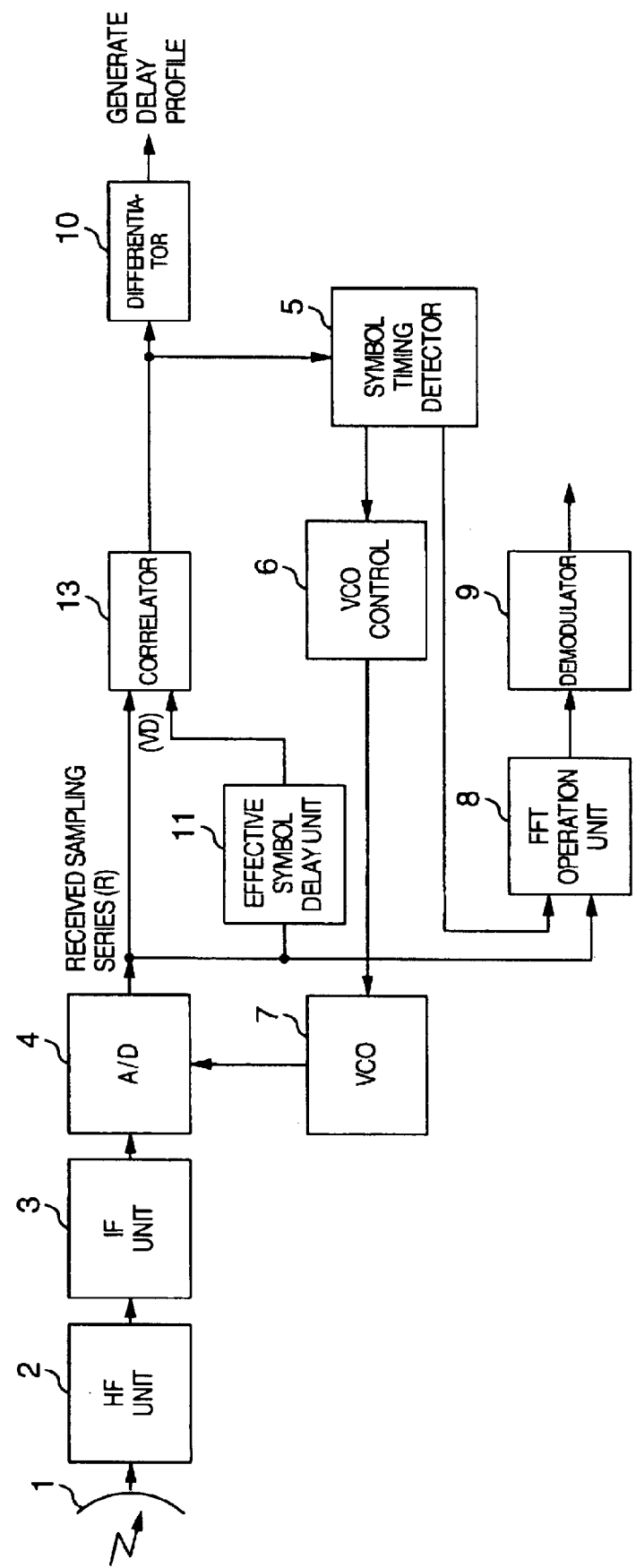
FIG. 16 is a block diagram showing an example of the configuration for the process of synchronized reproduction and the process of generating a delay profile for the conventional OFDM receiving apparatus.

In the operation of correlating the guard intervals for the receiver according to the prior art shown in FIG. 16, the insertion of the CP carriers raises the floor undesirably as indicated by the solid line in FIG. 9. This floor rise is caused by the correlation component of the CP carriers, and by removing the correlation component of the CP carriers by the subtractor 15 as described above, the floor is lowered as indicated by the dotted line in FIG. 9.

This produces the effect of reducing the possibility of error detection of the peak position in the correlation waveform.

The correlation value signal obtained from the subtractor 15 or the adder 16, therefore, represents the correct peak position of the cross-correlation, and therefore accurately indicates the position of the guard intervals of the received signal. In the symbol timing detector 5, the sampling clock frequency of the VCO 7 is controlled through the VCO controller 6 in such a manner as to secure a constant peak position (reference position), and thus the accurate clock reproduction can be realized. Also, in the symbol timing detector 5, a control signal for controlling the time window position for FFT operation is generated based on the correct peak position, and the timing of fetching the received sampling series (R) into the FFT operation unit 8 is controlled. In this way, the correct FFT operation process can be executed free of inter-symbol interferences.

Figure 5:
FIG. 5 shows a waveform of the guard interval correlation (averaged in symbol direction).
Figure 10:
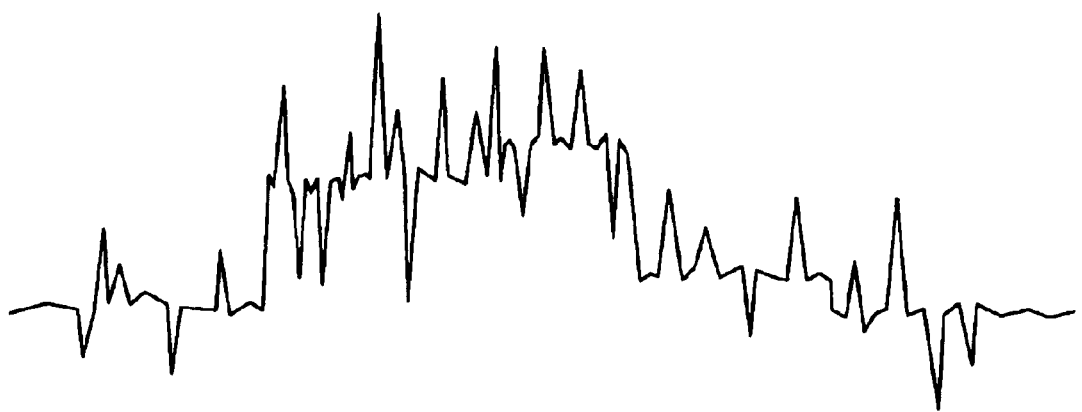
FIG. 10 shows a waveform of the guard interval correlation with CP carriers inserted.
Figure 11:
FIG. 11 shows a waveform of a delay profile with CP carriers inserted.

As described above, in the conventional receiver, the correlation of the guard intervals and the delay profile have mixed therein the correlation components of the CP carriers as shown in FIGS. 10 and 11, and therefore the waveform is disturbed. In the receiver according to the invention, in contrast, the waveform disturbance is eliminated as shown in FIGS. 5 and 6 by removing the correlation component of the CP carriers by the subtractor 15. Specifically, a delay profile waveform of high accuracy can be observed, like a delay profile free of the CP carriers, in a delay profile generator 17 based on the output of the differentiator 10.

Next, a specific example of the delay amount of the N-symbol delay unit 12 is described. Basically, the delay amount of the N symbols may take any value as long as only the correlation of the CP carriers can be extracted. Specifically, assuming that the delay amount is equal to the period length of two symbols, the correlation can be extracted in the case where the amplitude and phase of the CP carriers before the two symbols are the same.

Generally, the delay amount is set to N symbols (N: integer of 1 or more). In the mobile communication, however, the conditions of the propagation path undergo a change every moment, and therefore substantially the same propagation path conditions are required to be secured against the time difference of N symbols.

In the case where a low frequency band is used for transmission, the fading rate is low, and therefore the propagation path environment undergoes only a small change with a comparatively large N value. With the increase in frequency band, however, the fading rate increases and therefore the N value is desirably set smaller.

The smaller the N value, the smaller the delay amount, and so is the memory capacity. Generally, therefore, N is set to 1 to minimize the delay.

Figure 8B:
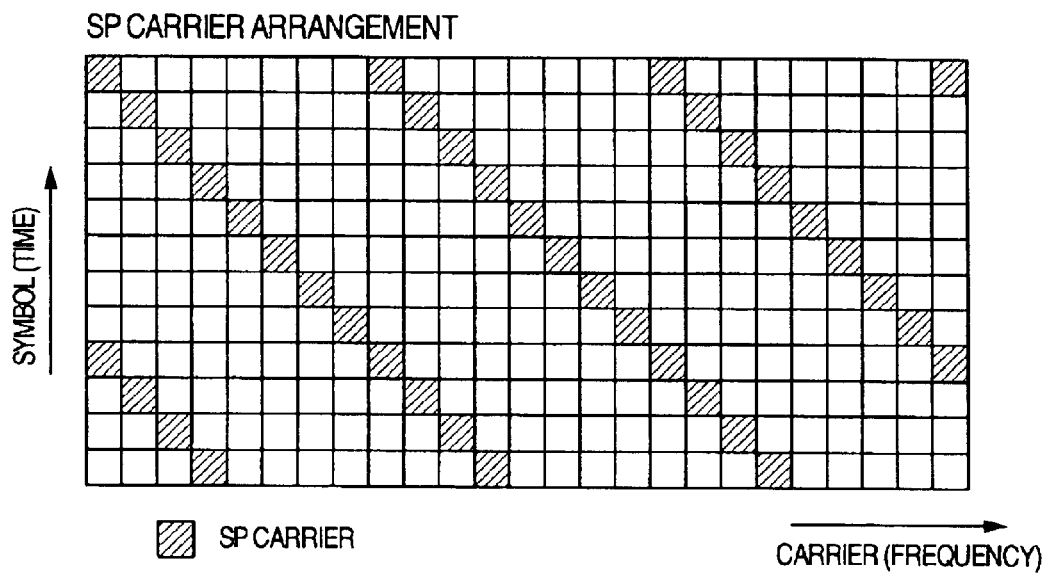

The pilot carriers inserted, as described with reference to FIG. 8B, may be SP carriers instead of CP carriers. In the case where the SP carriers are inserted, the delay amount of the N-symbol delay unit 12 is set to the insertion interval of the SP carriers. Then, the correlation of the SP carriers can be extracted. With reference to the case shown in FIG. 8B, the insertion interval of the SP carriers is 8 symbols. By setting N to 8 (delay of 8 symbols), therefore, the correlation between the SP carriers can be secured.

Figure 13:
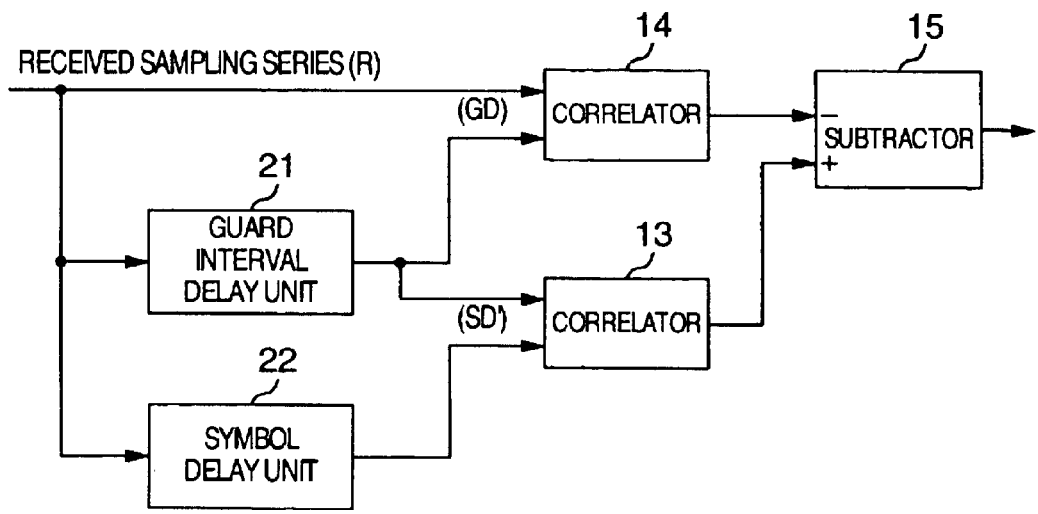
FIG. 13 is a block diagram showing the extraction of the data carrier correlation component for the receiving apparatus according to another embodiment of the invention.

Next, an embodiment which permits the memory capacity required for the delay to be reduced in the configuration of the invention described in FIG. 1 is described with reference to FIGS. 13 and 14. FIG. 13 is a diagram for explaining the configuration with a reduced memory capacity required for the delay, in which the component parts from the receiving antenna 1 to the A/D converter 4 and the component parts from the symbol timing detector 5 to the differentiator 10 in FIG. 1 are not shown. Instead, the valid symbol delay unit 11 shown in FIG. 1 is replaced with a guard interval delay unit 21, the N-symbol delay unit 12 is replaced with a guard interval delay unit 22, and the positive terminal and the negative terminal of the subtractor 15 are replaced with each other.

The input signal shown in FIG. 13 is input to the received sampling series (R) as in FIG. 1, and then to the guard interval delay unit 21 and the symbol delay unit 22. The guard interval delay unit 21 delays the signal by the length of the guard interval period, and the symbol delay unit 22 by the length of one symbol period.

The manner in which the operation of correlating the guard intervals according to the embodiment shown in FIG. 13 is performed is explained mainly with reference to the portion defined by the thick dotted line in FIG. 14.

Assume that the operation is performed to correlate the hatched portion q at the rear end of the first symbol of the output signal (GD) of the guard interval delay unit 21 and the guard interval portion of the second symbol in the received sampling series (R). Both are different symbols, and therefore the correlation only for the CP carriers is calculated by the correlator 14.

Assume, on the other hand, that the operation is performed to correlate the portion q at the rear end of the first symbol of the output signal (GD) of the guard interval delay unit 21 and the guard interval portion r of the first symbol of the output signal (SD') of the symbol delay unit 22. Since both are the same symbols, the combined correlation of the data carrier and the CP carrier is calculated by the correlator 13.

The correlation of the CP carriers providing the output signal of the correlator 14 is subtracted from the combined correlation of the data carrier and the CP carrier providing the output signal of the correlator 13 by the subtractor 15. Then, the effect similar to that in FIG. 1 is obtained.

Next, the memory capacities required for delay in the configurations of FIGS. 1 and 13 are compared with each other. The explanation will be given with reference to a case in which the valid symbol length is 1024 samples and the guard interval length is 128 samples. In FIG. 1, the valid symbol delay unit 11 requires a delay of 1024 samples, and the N-symbol delay unit 12 requires a delay of 1152 (=1024+128) samples. Therefore, a total delay of 2176 samples is required. In the configuration shown in FIG. 13, on the other hand, the guard interval delay unit 21 requires a delay of 128 samples, and the symbol delay unit 22 requires a delay of 1152 samples, for a total delay of 1280 samples. This can be realized only with a memory capacity about 0.6 times as large.

Next, a configuration with the memory capacity further reduced than in the embodiment of FIG. 13 is explained with reference to FIG. 15.

Figure 15:
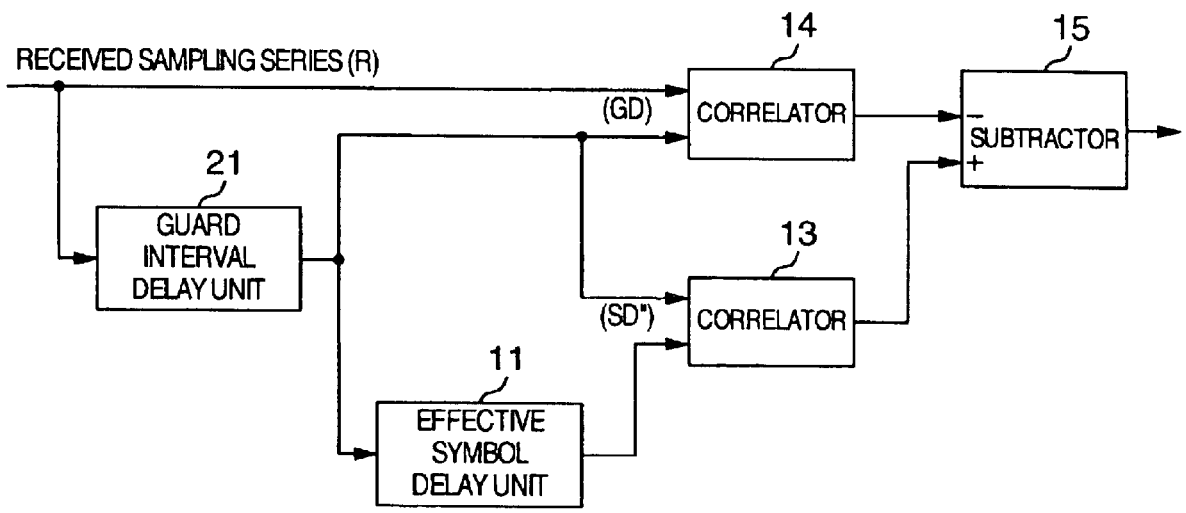
FIG. 15 is a block diagram showing the extraction of the data carrier correlation component for the receiving apparatus according to still another embodiment of the invention.

FIG. 15 shows a configuration in which the symbol delay unit 22 is removed, the output of the guard interval delay unit 21 is connected to the input of the valid symbol delay unit 11, and the output of the valid symbol delay unit 11 is connected to the input of the correlator 13 in the configuration shown in FIG. 13.

As explained with reference to FIG. 13, the symbol delay unit 22 requires a delay of one symbol period for the received sampling series (R). Since the guard interval delay unit 21 delays the signal by the length of the guard interval period, however, the output signal of the guard interval delay unit 21 is delayed in the symbol delay unit 22 by the length of the valid symbol period. In this way, the signal can be delayed a total of one symbol period.

The memory capacity required in the configuration shown in FIG. 15 is equal to an amount corresponding to a total of 1152 samples including the delay of 128 samples in the guard interval delay unit 21 and the delay of 1024 samples in the valid symbol delay unit 11. This can be realized by a memory capacity only about 0.5 times as large as that for the configuration shown in FIG. 1.

In the embodiments of the invention described above, the correlation component of the pilot carriers is extracted from a received signal containing both the data carriers and the pilot carriers, and further from the correlation component of the extracted pilot carriers, only the correlation component of the data carriers is extracted. In this way, the accurate position of the guard intervals of the received signal is detected.

Next, an embodiment is explained in which the modulation scheme of the signal sent out by the transmitter is automatically identified by utilizing the technique of extracting only the correlation component of the pilot carriers from the received signal according to the invention.

In the case where the differential scheme is used for the carriers as the signals to be modulated at the transmitting end, the pilot carriers such as the CP or the SP carriers need not be arranged. This is by reason of the fact that according to the differential scheme, the information code is assigned to the phase difference with the received signal one symbol before, and therefore only the phase difference is detected but the highly accurate reproduction of the absolute phase and amplitude is not required at the receiving end. Also, the differential scheme has the feature that the receiver can be configured in simplistic way. Though not described in detail, the performance feature of the differential scheme, as compared to the absolute detection scheme such as QAM, lies in that the deterioration of the signal quality is about several dB in the Gauss noise environment and advantageously low in the multi-path environment. For these reasons, the differential scheme or the absolute detection scheme is selectively used as a modulation scheme in accordance with the characteristics of the transmission path. Even in the case where the modulation scheme is changed at the transmitting end, the receiver is required to automatically follow the modulation scheme change. According to the invention, the modulation scheme can be automatically identified at the receiving end.

As described above, the operation of correlating the guard intervals produces the waveform as shown in FIG. 9. In the case where a modulation scheme containing the pilot carriers, i.e. the absolute detection scheme is used for modulation, the floor of the waveform undesirably rises as indicated by the solid line (with CP carriers) in FIG. 9. In the case where the differential scheme is used as a modulation scheme, on the other hand, the floor of the waveform remains substantially at zero as indicated by the dotted line (without CP carriers) in FIG. 9.

Thus, the the magnitude of the output value of the correlator 14 is considerably different between the absolute detection scheme and the differential scheme. Therefore, a given predetermined value is set and compared to the output value of the correlator 14. In the case where the output value of the correlator 14 is larger than the predetermined value, it can be determined that the absolute detection scheme is involved, while in the case where the output value of the correlator 14 is smaller than the predetermined value, the differential scheme is employed.

As described above, according to this invention, the presence or absence of the correlation component of the pilot carriers is detected by the cross-correlating operation of the guard intervals of the received signal, and therefore it can be determined at the receiving end, whether the modulation scheme of the received signal is the differential scheme or the absolute detection scheme.

According to this invention, the operation of correlating the guard intervals with pilot carriers inserted is performed in such a manner as to remove the adverse effect of the correlation component of the pilot carriers, and only the correlation of the data carriers is extracted. As a result, the performance is improved for synchronization using the correlating operation of the guard intervals and the generation of a delay profile.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A receiving apparatus for receiving the signal modulated by a multi-carrier modulation scheme for transmitting the information code using a plurality of carriers, said signal containing data carriers and periodically inserted pilot carriers fixed in amplitude and phase, said apparatus comprising:
    a correlating operation unit for calculating the cross-correlation between the received signals with data carriers distant to each other to such an extent as to eliminate the correlation substantially; and
    an extraction unit for extracting the correlation component of the signal as related to said pilot carriers, based on the result of the cross-correlating operation by said correlating operation unit.

2. A receiving apparatus according to claim 1,
    wherein said correlating operation unit includes a first correlating operation unit for calculating the cross-correlation between said received signal and a signal obtained by delaying said received signal by a time length corresponding to selected one of a predetermined symbol period or an insertion period of said pilot carriers; and
    wherein said extraction unit extracts the correlation component of the signal as related to said pilot carriers based on the result of the cross-correlating operation by said first correlating operation unit.

3. A receiving apparatus according to claim 2,
    wherein said correlating operation unit further includes a second correlating operation unit for calculating the cross-correlation between said received signal and a signal obtained by shifting said received signal relatively by a length equal to the valid symbol period; and
    wherein said extraction unit includes a subtractor for subtracting the result of the correlating operation of said first correlating operation unit from the result of the correlating operation of said second correlating operation unit.

4. A receiving apparatus according to claim 3, further comprising:
    a control unit to control the sampling clock frequency for sampling the received signal of said receiving apparatus into synchronism with a predetermined clock frequency of the transmission apparatus, based on the result of subtraction by said subtractor.

5. A receiving apparatus according to claim 4,
    wherein said control unit includes:
    an adder for extracting a signal in the extraction range corresponding to the guard interval period from the output of said subtractor, said extraction process being repeated each time said extraction range is shifted by one sample period over the entire signal section for said correlating operation thereby to add the values of the extracted signals;
    a symbol timing detector for determining the difference between the symbol phase of said received signal and a predetermined reference phase based on the result of addition by said adder; and
    a control unit for controlling the sampling clock frequency of said received signal in accordance with said detected difference.

6. A receiving apparatus according to claim 4,
    wherein said control unit generates a signal for controlling the position of the time window for FFT operation on the received signal in the receiving apparatus, based on the result of subtraction by said subtractor.

7. A receiving apparatus according to claim 4, further comprising a delay profile unit for generating a delay profile of said received signal, based on the result of subtraction by said subtractor.

8. A receiving apparatus according to claim 1,
wherein said correlating operation unit includes a first correlating operation unit for calculating the cross-correlation between said received signal and a signal obtained by delaying said received signal by a length equal to the guard interval period of the symbol, and
wherein said extraction unit extracts the correlation component of the signal as related to said pilot carriers, based on the result of the cross-correlating operation by said first correlating operation unit.

9. A receiving apparatus according to claim 8,
wherein said correlating operation unit further includes a second correlating operation unit for calculating the cross-correlation between said received signal and a signal obtained by shifting said received signal relatively by a length equal to the symbol period, and
wherein said extraction unit includes a subtractor for subtracting the result of the correlating operation of said first correlating operation unit from the result of the correlating operation of said second correlating operation unit.

10. A receiving apparatus according to claim 1,
wherein said correlating operation unit includes a first correlating operation unit for calculating the cross-correlation between said received signal and a signal obtained by delaying said received signal by a length equal to the guard interval period of the symbol, and
wherein said extraction unit extracts the correlation component of the signal as related to said pilot carriers, based on the result of the correlating operation by said first correlating operation unit.

11. A receiving apparatus according to claim 10,
wherein said correlating operation unit further includes a second correlating operation unit for calculating the cross-correlation between the output signal of said first correlating operation unit and a signal obtained by shifting the output signal of said first correlating operation unit relatively by a length equal to the valid symbol period; and
wherein said extraction unit includes a subtractor for subtracting the result of the correlating operation of said first correlating operation unit form the result of the correlating operation of said second correlating operation unit.

12. A method for receiving a signal modulated by a multi-carrier modulation scheme for transmitting the information code using a plurality of carriers, said signal containing data carriers and periodically inserted pilot carriers fixed in amplitude and phase, said method comprising:
a step of calculating the cross-correlation between the received signals with the data carriers distant to such an extent as to eliminate the correlation substantially; and
a step of extracting the correlation component of the signal as related to said pilot carriers, based on the result of the calculation of said cross-correlation.

13. A receiving method according to claim 12,
wherein said correlating operation step includes the first correlating operation step for calculating the cross-correlation between said received signal and a signal obtained by delaying said received signal by a length equal to selected one of a predetermined symbol period or an insertion period of said pilot carriers, and
wherein said extraction step extracts the correlation component of the signal as related to said pilot carriers, based on the result of the correlating operation in said first correlating operation step.

14. A receiving method according to claim 13,
wherein said correlating operation step further includes the second correlating operation step for calculating the cross-correlation between said received signal and a signal obtained by shifting said received signal relatively by a length equal to the valid symbol period, and
wherein said extraction step includes the step of subtracting the result of the correlating operation of said first correlating operation step from the result of the correlating operation of said second correlating operation step.

15. A receiving method according to claim 14, further comprising:
a step of controlling the sampling clock frequency for sampling said received signal into synchronism with a predetermined clock frequency of the transmitter, based on the result of subtraction in said subtraction step.

16. A receiving method according to claim 15,
wherein said control step includes:
an addition step of extracting the signal in the extraction range corresponding to the guard interval period from the result of said subtraction step and repeating the extraction each time said extraction range is shifted by one sample period over the signal section for said correlating operation, the values of said extracted signals being added to each other;
a step of determining the difference between the symbol phase of said received signal and a predetermined reference phase, based on the result of addition in said addition step; and
a control step of controlling the sampling clock frequency of said received signal in accordance with said detected difference.

17. A receiving method according to claim 15,
wherein said control step further includes the step of generating a signal for controlling the position of the temporal window for FFT operation of said received signal, based on the result of said subtraction.

18. A receiving method according to claim 15, further comprising:
a step of generating a delay profile of said received signal based on said result of subtraction.

19. A receiving method according to claim 12,
wherein said correlating operation step includes a first correlating operation step for calculating the cross-correlation between said received signal and a signal obtained by delaying said received signal by a length equal to the guard interval period, and
wherein said extraction step extracts the signal correlation component as related to said pilot carriers, based on the result of the cross-correlating operation in said first correlating operation step.

20. A receiving method according to claim 19,
wherein said correlating operation step further includes a second correlating operation step for calculating the cross-correlation between said received signal and a signal obtained by shifting said received signal by a length equal to the symbol period, and
wherein said extraction step includes the step for subtracting the result of the correlating operation of said first correlating operation step from the result of the correlating operation in said second correlating operation step.

21. A receiving method according to claim 12, wherein said correlating operation step includes a first correlating operation step for calculating the cross-correlation between said received signal and a signal obtained by delaying said received signal by a length equal to the guard interval period, and wherein said extraction step extracts the signal correlation component as related to said pilot carriers, based on the result of the cross-correlating operation in said first correlating operation step.

22. A receiving method according to claim 21, wherein said correlating operation step further includes a second correlating operation step for calculating the cross-correlation between the output signal of said first correlating operation step and a signal obtained by shifting the result of operation in said first correlating operation step relatively by a length equal to the valid symbol period; and wherein said extraction step includes the step for subtracting the result of the correlating operation in said first correlating operation step from the result of the correlating operation in said second correlating operation step.

* * * * *